United States Patent [19]

Gustafsson et al.

[11] Patent Number: 5,480,849
[45] Date of Patent: Jan. 2, 1996

[54] METHOD FOR THE PREPARATION OF A POLYMERIZING CATALYST COMPONENT, A POLYMERIZING CATALYST COMPONENT PREPARED BY THE METHOD AND ITS USE

[75] Inventors: Bill Gustafsson; Arja Kostiainen; Pekka Sormunen, all of Porvoo, Finland

[73] Assignee: Borealis Holding A/S, Lyngby, Denmark

[21] Appl. No.: 75,596

[22] PCT Filed: Dec. 17, 1991

[86] PCT No.: PCT/FI91/00391

§ 371 Date: Aug. 16, 1993

§ 102(e) Date: Aug. 16, 1993

[87] PCT Pub. No.: WO92/11296

PCT Pub. Date: Jul. 9, 1992

[30] Foreign Application Priority Data

Dec. 19, 1990 [FI] Finland ...................... 906281

[51] Int. Cl.⁶ .................. B01J 31/12; C08F 4/42; C08F 2/00
[52] U.S. Cl. .................. 502/115; 502/103; 502/110; 502/114; 526/123.1; 526/129
[58] Field of Search .................. 502/103, 110, 502/114, 115; 526/123, 129

[56] References Cited

U.S. PATENT DOCUMENTS

| | | | |
|---|---|---|---|
| 4,124,532 | 11/1978 | Giannini et al. | 252/429 B |
| 4,173,547 | 11/1979 | Graff | 502/115 |
| 4,174,429 | 11/1979 | Giannini et al. | 526/114 |
| 4,277,589 | 7/1981 | Giannini et al. | 526/122 |
| 4,302,566 | 11/1981 | Karol et al. | 526/125 |
| 4,349,648 | 9/1982 | Jorgenson et al. | 526/125 |
| 4,354,009 | 10/1982 | Goeke et al. | 526/125 |
| 4,359,561 | 11/1982 | Fraser et al. | 526/88 |
| 4,383,095 | 5/1983 | Goeke et al. | 526/8 |
| 4,427,573 | 1/1984 | Miles et al. | 502/111 |
| 4,467,044 | 8/1984 | Band | 502/111 |
| 4,482,687 | 11/1984 | Noshay et al. | 526/125 |
| 4,670,413 | 6/1987 | Furtek | 502/120 |
| 4,670,526 | 6/1987 | Cann et al. | 526/125 |
| 4,732,882 | 3/1988 | Allen et al. | 502/104 |
| 5,006,500 | 4/1991 | Chang | 502/110 |

FOREIGN PATENT DOCUMENTS

| | | |
|---|---|---|
| 006110A2 | 1/1980 | European Pat. Off. . |
| 020818A1 | 1/1981 | European Pat. Off. . |
| 043220A1 | 1/1982 | European Pat. Off. . |
| 055605A2 | 7/1982 | European Pat. Off. . |
| 080052A1 | 6/1983 | European Pat. Off. . |
| 091135A1 | 10/1983 | European Pat. Off. . |
| 120503A1 | 10/1984 | European Pat. Off. . |
| 267794A2 | 5/1988 | European Pat. Off. . |
| 296561A2 | 12/1988 | European Pat. Off. . |
| 389173A2 | 9/1990 | European Pat. Off. . |
| 0516458 | 12/1992 | European Pat. Off. ............ 502/115 |
| 78113 | 9/1984 | Finland . |
| WO88/02376 | 4/1988 | WIPO . |
| WO91/07443 | 5/1991 | WIPO . |
| WO86/05500 | 9/2986 | WIPO . |

*Primary Examiner*—E. Rollins Cross
*Assistant Examiner*—Walter D. Griffin
*Attorney, Agent, or Firm*—Marshall, O'Toole, Gerstein, Murray & Borun

[57] ABSTRACT

The invention relates to a process for the preparation of a solid procatalyst composition of a catalyst system for the polymerization of olefins wherein a magnesium halide such as magnesium chloride is dissolved and/or suspended into an alkyl ester of a monocarboxylic acid such as ethyl acetate, impregnated to a carrier, treated with an organometallic compound or a silicon compound and thereafter with a transition metal compound. The invention also relates to a procatalyst composition and its use together with a cocatalyst for the polymerization of olefins. The activity has been enhanced according to the invention by the use of a carrier containing hydroxyl groups, which carrier is kept at a temperature of at most about 200° C. prior to the impregnation so that the hydroxyl groups are retained in the carrier to an essential extent until the impregnation step. The carrier is preferably silica which is treated thermally at 100°–200° C. so that the water present is removed but the hydroxyl groups are retained to a considerable extent. The organometal compound is preferably an aluminumalkyl compound such as triethylaluminum, and the transition metal compound is preferably titanium tetrachloride.

11 Claims, No Drawings ns at a temperature of at most about 200° C. so that the hydroxyl groups are retained in the carrier to an essential extent until the impregnating step.

METHOD FOR THE PREPARATION OF A POLYMERIZING CATALYST COMPONENT, A POLYMERIZING CATALYST COMPONENT PREPARED BY THE METHOD AND ITS USE

The present invention relates to a method for the preparation of a solid procatalyst composition of a catalyst system for the polymerization of olefins wherein a carrier is impregnated with a magnesium halide dissolved or suspended in a monocarboxylic acid alkyl ester, and the impregnated carrier is reacted with an organometallic compound or a silicon compound and treated with a transition metal compound.

In the polymerization of olefins a so called Ziegler-Natta-catalyst system consisting of a so called procatalyst and a co-catalyst usually is used. The procatalyst is based on a compound of a transition metal belonging to some of the groups IVB-VIII of the periodic system of the elements and the co-catalyst is based on an organometallic compound of a metal belonging to some of the groups IA-IIIA of the periodic system of the elements.

It is conventional to use in the preparation of heterogeneous polymerization catalysts as a component enhancing the polymerization activity of the procatalysts a support carrier on which the transition metal compound is superposed. Usual carriers are silica, aluminum oxide, magnesium oxide, titanium oxide, carbon in different forms an different polymer types. Important carriers include the magnesium compounds such as alkoxides, hydroxides, hydroxy halides and halides, of which the latter, in particular magnesium dichloride, have recently become the most significant carrier components of procatalyst compositions.

Because magnesium halides are in their base crystal form not activated very efficiently with a transition metal compound, their crystal form has to be deformed. Traditionally this is carried out by grinding e.g. in a ball mill typically resulting in a finely divided powder with a large specific surface of which the particles have a strongly deformed crystal lattices. When such a powder is activated to a procatalyst composition by superposing on it a transition metal compound, and thereafter reduced with an organometallic compound as a co-catalyst, a very active polymerization catalyst is obtained.

The usual method for grinding magnesium halide include the drawbacks that it is very energy consuming, causes wearing and corrosion of the apparatus and is suited to the production of catalyst only with the tedious batch process.

A more modern method to lessen the crystallinity of the magnesium halide and thereby enhance its ability to become activated with a transition metal compound is to modify it chemically. Thereby a magnesium halide, an electron donor and a transition metal compound are reacted with each other, often in a solution, to an easily isolated procatalyst composition.

U.S. Pat. Nos. 4,124,532 and 4,174,429 describe the preparation of this kind of catalytically active complex by reacting a magnesium halide and a transition metal compound at a suitable ratio in a electron donor solvent. The finished complex can be separated through crystallization, by evaporation of the said solvent, or by mixing the complex with a solvent in which is not soluble. Because such complex compounds are formed as a result of a spontaneous crystallization, their crystal structure is very regular and activity correspondingly rather limited.

U.S. Pat. No. 4,302,566 and EP Patent Application 6,110 describe a precursor formed by a magnesium halide, a transition metal compound and an electron donor. The precursor is formed by precipitation from an electron donor solution whereafter it is separated and mixed with an aluminumalkyl and a separate inert carrier.

In these processes an essentially amorphous procatalyst composition is not formed either, because the precursor in question is crystallized in the preparation spontaneously and its morphology is not essentially changed after that.

Other patent publications describe Ziegler-Natta procatalysts on a silica or magnesium silicate carrier but do not take advantage of the superior ability of the magnesium compounds to activate transition metals. Such publications include e.g.: WO-88/02376, EP-215,916, EP-120,503, EP-91,135, EP-80,052, EP-55,605, EP-43,220, EP-20818, U.S. Pat. Nos. 4,482,687, 4,383,095, 4,354,009, 4,349,648 and 4,359,561.

U.S. Pat. No. 4,670,526 describes a process for the activation of a catalyst wherein a divalent magnesium halide together with a Lewis acid, e.g. an ethyl aluminum chloride, is dissolved in an excess of an electron donor, and the complex obtained is separated from the excess of electron donor before the treatment with a titanium or a vanadium compound. The complex is alternatively also superposed on silica.

EP Patent Application 267,794A2 describes a catalyst system which is prepared by combining silica or alumina with a magnesium halide and an organometallic compound. The combining is typically carried out by dissolving the magnesium halide in an inert solvent, of which solvents ethyl acetate also is mentioned. About silica it is mentioned that it can contain minor amounts of water although in the silica is calcined in the working examples. Before the treatment with a transition metal compound the catalyst component is according to the working examples treated with an electron donor, e.g. vinyl ethoxy silane and triphenyl phosphite, presumably in order to enhance the isotacticity of the polypropylene obtained with the catalyst.

The present invention has as an object to provide a method for the preparation of a procatalyst composition comprising of consisting of a carrier, a magnesium halide, an organometallic or a silicon compound, and a transition metal compound which procatalyst composition is structurally as amorphous as possible and hence catalytically as active as possible, which method is easier than the prior art methods. The invention also has as an object a method for the preparation of a solid catalyst system for the polymerization of olefins wherein a separate step for grinding of the magnesium halide is not needed and the treatment with a transition metal compound is carried out in so late step of preparation that in its complexing no more recrystallization or loss of activity of the product takes place. The invention also has as an object to find as appropriate use for the novel procatalyst composition as possible in the polymerization or copolymerization of olefins and especially α-olefins such as ethylene, for example, in combination with an organometallic co-catalyst compound of aluminum and, optionally, an external donor.

These objects have been fulfilled according to the invention by the use of a carrier containing hydroxyl groups, which carrier is kept prior to the impregnation at a temperature of at most about 200° C. so that the hydroxyl groups are retained in the carrier to an essential extent until the impregnating step.

The invention hence resides in that the change of the morphology of the magnesium halide required for the activity is provided by impregnating a separate inert inactivated hydroxyl-containing carrier with the magnesium halide dissolved or suspended in a monocarboxylic acid alkyl ester. When the impregnated carrier is then reacted with an organometallic compound such as an organometallic compound of a metal belonging to some of the groups IA-IIIA, preferably an aluminumalkyl compound or a silicon compound, preferably a halide or alkyl halide compound in order to remove excess water, as a result a solid carrier coated with a magnesium halide is obtained from which also the hydroxyl groups impairing the catalytic properties have been removed.

It is essential that the removal of the hydroxyl groups of the carrier takes place simultaneously with the removal of the excess of the solvent ester wherein separate activation of the carrier before the impregnation step is avoided. By activation herein is meant a treatment wherein the surface hydroxyl groups bound to the carrier are removed by a chemical and/or thermal treatment. The removal from the carrier of solely physisorbed water is not here considered to be activation. Such an activating step is on an industrial scale from the investment point of view an expensive and time consuming process while it has in general to be carried out by fluidizing the carrier at a temperature over 300° C. In general in addition to this thermal activation, calcination has been advantageous to remove all the remaining hydroxyl groups with a chemical treatment, e.g. with an organoaluminum compound or a silicon compound.

Finally the carrier treated as mentioned is manipulated with a transition metal compound such as titanium tetrachloride. One of the useful characteristics of the invention is that the treatment with the transition metal compound takes place later than in the conventional homogenous activation of a procatalyst composition whereby the recrystallization of the procatalyst composition is avoided and the activity of the mixture is hence retained.

The preparation of the solid procatalyst composition of a catalyst system for the polymerization of olefins hence begins with dissolving or suspending anhydrous magnesium halide in a suitable monocarboxylic acid alkyl ester as a solvent. Preferred magnesium halides include the use of chlorine, bromine, iodine or a mixture of the halides. The most preferable magnesium halide is anhydrous and dry magnesium dichloride ($MgCl_2$). The ester used as a solvent is a liquid under the process conditions, in which solvent the magnesium compound is partially or preferably totally soluble. It is preferably an alkyl ester of a carboxylic acid containing 1–10 carbon atoms and quite especially ethyl acetate. The dissolving of the magnesium halide is carried out, if needed, by mixing at an elevated temperature.

In the following step a separate hydroxyl-containing carrier is impregnated with the obtained solution or suspension of magnesium halide. An alternative method for superposing magnesium halide on a carrier is to add the magnesium halide and the solvent concurrently with the carrier to form a suspension from which the magnesium halide after have been dissolved is at least essentially superposed on the carrier surface.

The inert carrier is preferably an inorganic oxide of silicon, (silica), although other inorganic hydroxyl-containing oxides such as Mg, Al and Ti oxides and/or salts such as magnesium silicate can be used. The particle size of silica is 10–200 µm, preferably 40–150 µm. It is preferably chosen to give as narrow particle size distribution as possible. In addition these carriers are porous and their area is preferably over 100 $m^2/g$ and pore volume greater than 1 $cm^3/g$. The untreated silica contains water which is removed with a thermal treatment, e.g. 100°–200° C., preferably 150°–200° C., or for instance by distilling water azeotropically with aid of heptane. Although the water present in the silica is removed, the silica contains many hydroxyl groups. In the known methods these have been removed in different ways, ie. by warming in an oven, in a stream of nitrogen or in atmosphere to a temperature of at least 200° C. and usually about 600° C., or by chemical methods.

In the present invention it has been found that when a hydroxyl-containing carrier is used the hydroxyl groups of which have essentially been retained until the impregnation step, the disadvantageous features of the drying in an oven, calcination and chemical treatment are avoided and at same time better results are obtained in respect of the properties of the catalyst. The most essential advantage is that the process is simplified because as the only measure the carrier can require the removal of the water present at a temperature of about 100°–200° C., preferably 150°–200° C.

The removal of water which is carried before the impregnation can be carried out by warming the carrier to a temperature of 100°–200° C., preferably with aid of a stream of gas, e.g. nitrogen. In laboratory scale this step can be carried out practically also in a separate oven because when small quantities of material and low temperatures are in question this can be carried out with very simple apparatus. Another way to remove water is to distill the water azeotropically e.g. with the aid of heptane. This is preferable especially with large amounts of material.

When the hydroxyl-containing carrier has been impregnated with a magnesium halide solution or suspension which is carried, if needed, at an elevated temperature, the solvents are evaporated and the impregnated carrier is then reacted by treating it with an organometallic compound of a metal belonging to some of the groups IA-IIIA, preferably with an aluminumalkyl compound or a silicon compound, preferably a chloride or an alkylchloride. Following this treatment the product obtained can be washed in order to remove the dissolved reaction products, but the washing step is not necessary.

The treatment with the transition metal compound is preferably carried out by preparing from the above mentioned impregnated and dried carrier particles a hydrocarbon suspension in which the transition metal is added, or by adding it directly to the solution from the previous treatment. This treatment can be accelerated by the use of mixing and an elevated temperature. The transition metal compound is preferably a halide compound containing titanium, vanadium and/or zirconium. Especially preferable are the titanium compounds and the most preferable is titanium tetrachloride $TiCl_4$.

The procatalyst composition obtained after the transition metal compound is dried and analyzed. The washing steps are not necessary; good results have been obtained although the solvent has only been evaporated or the procatalyst is remaining as a suspension. The treatment with an organometallic or silicon compound and the treatment with a transition metal can also be carried out using so called dry-mixing without suspending into an excess of a hydrocarbon solvent.

From the tests carried out in connection of the invention it was surprisingly found that the performance of the catalyst prepared by the described method was excellent and that it suited especially well for the polymerization of ethylene with a high activity and good hydrogen sensitivity although the tedious carrier activation step preceding the impregnation could be avoided. The polymer obtained had a narrow molecular weight distribution (MWD) and good morphology for various uses. The specific advance of this invention compared to FI Patent Application 891313 is the enhanced activity expressly with aid of the chemical removal of the excess of electron donor and to FI Patent Application 895526 the essentially easier method for the preparation of the catalyst; we have e.g. surprisingly found out that from the production steps of the catalyst in particular the time consuming and tedious steps in view of the process can be avoided wherein the additional siphonations and filterings can be excluded (cf. Examples 2 and 3).

EXAMPLES

Separate carriers

When as the separate carrier silica is used, it is first treated simply e.g. in the same reaction vessel or separately for some hours with a mild heating at 150°–200° C. without the presence of solvents.

In the following examples silica (Davison 955) has been kept for 4 hours at a temperature of 150° C. in a glass pipe leading nitrogen through the pipe.

EXAMPLE 1a 15 grams of silica which had been dried by the above mentioned method was added to a 500-mL reactor. Meanwhile in an other flask a solution of $MgCl_2$ in ethyl acetate (EA) was prepared by dissolving 4.5 grams of $MgCl_2$ into 200 mL of dried ethyl acetate at a temperature of 70° C. mixing for 2 hours.

This solution was conducted onto the silica, mixed for 1 hour at a temperature of 80° C. and dried. 19.1 grams of a product was obtained containing 5.7% of Mg and 13.2% of EA.

EXAMPLE 1b 2.5 grams of silica which had been dried by the above mentioned method was treated according to Example 1a but using 0.75 grams of $MgCl_2$ and 33 mL of EA.

EXAMPLE 2

3.5 grams of the impregnated carrier (containing Mg 0.008 moles, EA 0.005 moles, $SiO_2$, estimated OH-content 5.67 mmoles) prepared in Example 1 was suspended into pentane. To this was added slowly at room temperature 19 mL of a 10% wt. solution of triethylaluminum (TEA) in pentane (0.011 moles, Al/(EA+OH)=1:1). The temperature was raised to the boiling point of pentane and kept at this temperature for 40 minutes. Next the reaction product thus obtained was washed with pentane and heptane. The washed reaction product was resuspended into heptane and 9 mL of $TiCl_4$ (0.003 moles) was added and mixed at a temperature of 60° C. for 4 hours. The procatalyst obtained was weighed after washings and drying, yield 3.2 grams. It contained 4.3% of Mg, 1.6% of Al, 4.6% of Ti and 4.0% of EA. The polymerization results are presented in Table 1.

EXAMPLE 3

3.5 grams of the carrier prepared in Example 1 was treated by the method explained in Example 2 using now also 19 mL of a 10% wt. solution of TEA in pentane. Thereafter a titanation was carrier out using this time only 0.9 mL of $TiCl_4$; temperature 60° C. for 4 hours. The obtained reaction product was not washed but just dried, for a yield of 1.53 grams. The procatalyst composition contained 4.1% of Mg and 5.1% of Ti, 1.7% of Al and 3.9% of EA.

EXAMPLE 4

A procatalyst composition was prepared as in Example 3 but now using only 0.3 mL of $TiCl_4$. The yield was 3.0 grams of a procatalyst composition containing 4.7% of Mg, 3.2% of Ti, 1.9% of Al and 3.5% of EA.

EXAMPLE 5

2.5 grams of the carrier prepared in Example 1 was suspended into 10 mL of heptane, 6.5 mL of a 10% wt. solution of TEA in pentane was added and mixed for 2 hours at a temperature of 40° C. After drying (without washing) the obtained reaction product was resuspended into heptane, 0.2 mL of $TiCl_4$ was added and mixed for 2 hours at a temperature of 60° C. Finally the procatalyst was dried, with a yield of 1.4 grams. The procatalyst composition contained 3.6% of Mg, 3.6% of Al, 5.1% of Ti and 6.8% of EA. Although the ethyl acetate remainder without washings was higher than usual the performance of the catalyst was still good (Table 1).

EXAMPLE 6

A procatalyst composition as prepared as in Example 5 but now using 10 mL of the TEA solution. 2.75 grams of a procatalyst composition was obtained containing 3.4% of Mg, 3.3% of Al, 4.9% of Ti and 4.1% of EA.

EXAMPLE 7

A procatalyst composition was prepared as in Example 5 but now the $MgCl_2$-silica carrier was not dried after the TEA treatment but the excess of solution was siphoned off, the carrier was suspended into heptane and titanated. The obtained procatalyst composition contained: 4.0% of Mg, 2.7% of Ti, 2.3% of Al and 5.8% of EA.

EXAMPLE 8

This example shows that an acceptable catalyst can also be produced without suspending the solid materials into an excess of hydrocarbon solvent using a so called dry-mixing technique.

3.6 grams of the carrier prepared in Example 1b was mixed with 9.6 mL of a 10% solution of TEA for 1 hour at a temperature of 40° C. After drying the mixing was continued for further 3 hours at the same temperature. To the dry carrier mixture 0.28 mL of $TiCl_4$ was added and the dry powder was mixed for 16 hours also at a temperature of 40° C. and finally further at a temperature of 60° C. for 1.5 hours. 3.26 grams of a procatalyst composition was obtained containing 4.0% of Mg, 3.9% of Al, 4.8% of Ti and 9.4% of EA.

Test polymerization

The test polymerization of ethylene was carried out in each of the Examples by the following method: a 3-L autoclave was loaded with 1.8 L of isobutane which had been purified with oxygen and moisture removers. 40–100 milligrams of the procatalyst composition was fed to the reactor with the aluminumalkyl (TEA, Al/Ti=50–75). The temperature was raised to 90° C. A 0.5-L pressure vessel or bomb was pressurized to 5 bars with hydrogen and conducted together with ethylene to the reactor until the total pressure was 28 bars. The polymerization was carried out for 1 hour and the total pressure was kept constant with aid of the ethylene feed.

TABLE

| | | Polymerization results | | | | | |
|---|---|---|---|---|---|---|---|
| Example | mg cat. | activity g/g cat | g/g Ti | MI(21.6) | MI (2.16) | MFR(21/2) | BD g/ml |
| 2 | 44 | 6070 | 132,000 | 16.7 | 0.45 | 37.0 | 0.42 |
| 3 | 45 | 6540 | 128,000 | 15.6 | 0.47 | 32.9 | 0.34 |
| 4 | 52 | 5920 | 185,000 | 15.1 | 0.49 | 30.9 | 0.36 |
| 5 | 55 | 5619 | 110,000 | 27.9 | 0.9 | 30.1 | 0.38 |
| 6 | 56 | 5458 | 111,000 | 40.9 | 1.3 | 30.7 | 0.38 |
| 7 | 50 | 4896 | 181,300 | 31.9 | 1.1 | 30.2 | 0.38 |
| 8 | 54 | 2222 | 46,000 | 20.1 | 0.6 | 31.9 | 0.31 |

MI: melt index, ASTM D 1238, conditions 190° C./21,6 kilograins and 2,16 kilograins?
MFR: melt flow ratio, melt indices 21,6 kilograins and 2,16 kilograins
BD: bulk density, grams/ml

We claim:

1. A process for the preparation of a solid procatalyst composition of a catalyst system for the polymerization of olefins wherein a carrier is impregnated with a solution or a suspension of a magnesium halide in an alkyl ester of a monocarboxylic acid, and the impregnated carrier is reacted with an organometallic compound selected from the members of Groups IA-IIIA and contacted with a catalytically active transition metal compound, wherein a hydroxy-containing carrier is used which prior to the impregnation step is kept at a temperature of at most about 200° C. so that the hydroxyl groups are essentially retained in the carrier until the impregnation step.

2. The process of claim 1 wherein the carrier is treated thermally at a temperature of about 100°– 200° C. wherein any water present is removed from the carrier and the hydroxyl-containing carrier is thereafter impregnated with said solution or suspension.

3. The process of claim 1 wherein the carrier is silica.

4. The process of claim 1 wherein the magnesium halide is anhydrous magnesium chloride and that the alkyl ester of monocarboxylic acid is ethyl acetate.

5. The process of claim 1 wherein the organometallic compound is an aluminum alkyl compound and the transition metal compound is a titanium halide.

6. The process of claim 5 wherein said aluminum alkyl compound is triethyl aluminum and said titanium halide is titanium tetrachloride.

7. The process of claim 1 wherein said transition metal compound is a transition metal halide.

8. The process of claim 7 wherein said transition metal halide is a halide compound containing one or more of titanium, vanadium, and zirconium.

9. A solid procatalyst composition of a catalyst system for the polymerization of olefins prepared by the process of any one of claims 1–8.

10. A method of olefin polymerization comprising the step of polymerizing one or more α-olefins in the presence of a procatalyst composition prepared according to the process of any one of claims 1–8 in combination with an organoaluminum cocatalyst.

11. The method of claim 10 wherein said α-olefin is ethylene.

* * * * *